July 26, 1966 T. E. BAN 3,262,771
RECOVERY OF STEEL AND ZINC FROM WASTE MATERIALS
Filed June 20, 1963
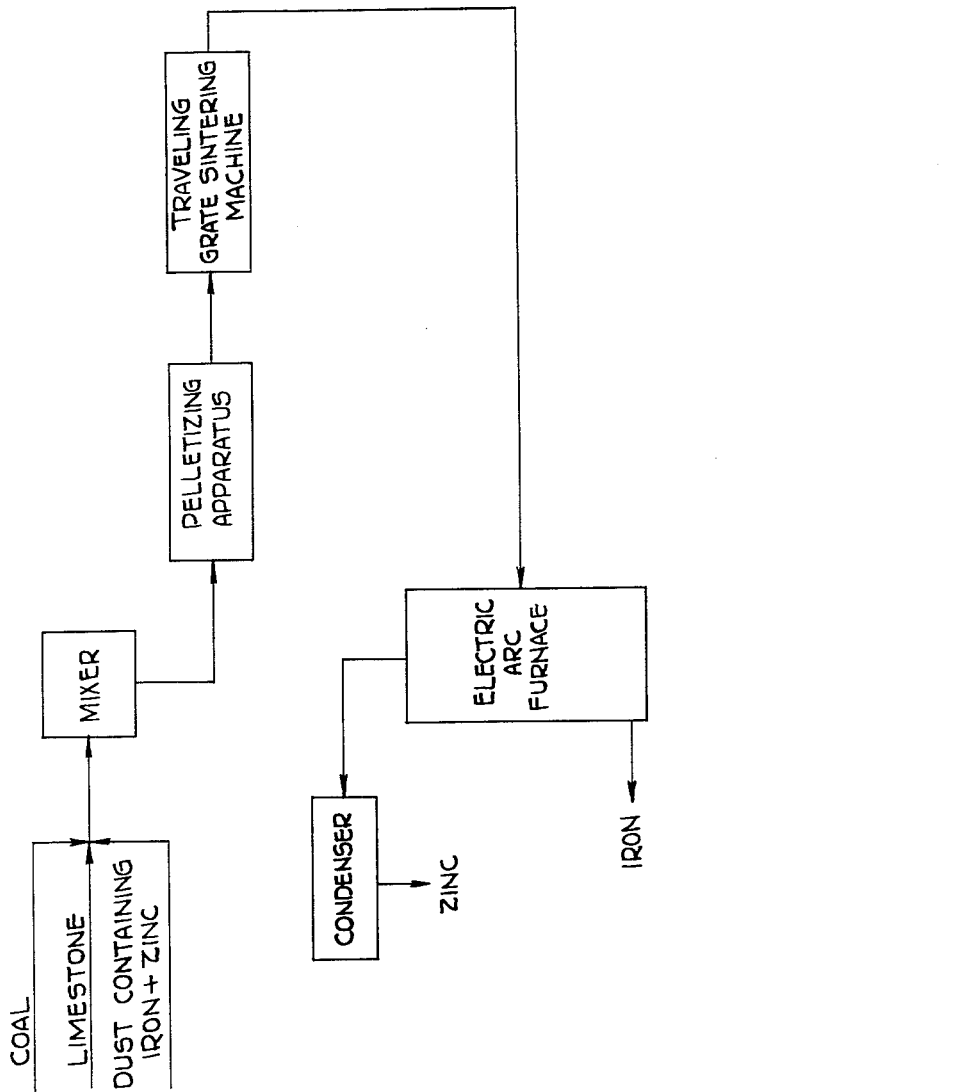
INVENTOR.
THOMAS E. BAN
BY
ATTORNEY.

United States Patent Office 3,262,771
Patented July 26, 1966

3,262,771
RECOVERY OF STEEL AND ZINC FROM WASTE MATERIALS
Thomas E. Ban, Cleveland, Ohio, assignor to McDowell-Wellman Engineering Company, Cleveland, Ohio, a corporation of Ohio
Filed June 20, 1963, Ser. No. 289,224
3 Claims. (Cl. 75—11)

The present invention relates to a method for recovering iron and zinc from waste materials of the type customarily produced in steel making operations. More particularly the invention relates to a process wherein zinc and iron are recovered separately from the aforementioned waste materials.

In iron and steel manufacturing operations fumes are evolved which present a potential source of troublesome atmospheric pollution problems. It is therefore customary to operate fume abatement devices in connection with the iron making operations so that atmospheric pollution is minimized and also so that valuable materials may be recovered which would otherwise be lost to the atmosphere. As is well known in the art, a certain amount of scrap metal is customarily charged to steel making operations and since some of the scrap will be of the galvanized variety, the material recovered from the fume abatement devices will usually comprise some zinc as well as iron oxide. This is so because of the relatively low volatility of zinc relative to iron. It is therefore one object of this invention to provide a method of recovering both the iron and zinc values from the waste materials obtained from fume abatement devices employed in connection with steel making operations.

In brief, the process of this invention comprises the steps of (1) preparing a mixture of coal, limestone and the waste material from the steel making operation; (2) forming the aforesaid mixture into pellets; (3) sintering said pellets in a traveling grate sintering machine; and finally, (4) transferring the sintered pellets to a conventional buried arc electric furnace wherein zinc is volatilized and withdrawn as an overhead gas and iron and slag are removed from the furnace and separated according to conventional techniques.

The attached drawing presents a schematic flow diagram of the process of this invention, and this drawing is referred to in the following description of the process.

Finely divided (i.e. a particle size range of —48 mesh to —100 mesh) coal and limestone are mixed with the finely divided waste material obtained from a fume abatement device such as for example an electrostatic precipitator (not shown). These materials are conveyed to a mixer-grinder of conventional type such as a ball mill where they are intimately mixed. The output of the mill is transferred at a regulated rate into the upper end of a conventional pelletizing pan which is open at its upper end and slightly inclined from the vertical towards the open end. Means are provided to rotate the pan at a relatively fast peripheral speed. A predetermined quantity of water is sprayed into the pan at its open end. As the pan turns the material will agglomerate into small spheres which roll over and over upon the remaining material which is introduced from the mixer whereby the spheres gradually increase in size. When the spheres or pellets attain sufficient size they will automatically roll out of the open end of the pan. These so-called green pellets are collected and conveyed to a conventional traveling grate sintering machine.

Traveling grate sintering machines are widely employed in the metallurgical arts and the principles of their operation are well understood. In general, such machines comprise a continuous series of pallets as a belt made up of a plurality of grates which is power driven and passes continuously through an enclosed chamber which is equipped with a gas exhausting means, such as a fan to insure the flow of gas through the enclosed chamber. Usually means are provided for supplying heat to the grates as they pass through the chamber. In operation the charge to the sintering machine is distributed evenly on the grates to the desired depth and the pelletized material emerging from the machine will fall from the grates as they begin their return trip to the entrance of the machine.

In the sintering machine the green pellets are dried and partial combustion of the coal in the pellets is initiated. This results in the partial destructive distillation of the coal which serves to partially reduce the iron oxide in the pellets. During this operation the limestone is calcined and the pellets are char-bonded. The pellets now contain a quantity of lime which serves as a flux and they may be transferred without further treatment directly into a conventional electric arc furnace. In this furnace the iron oxide in the pellets will be converted into iron by means of the fluxing action of the lime and the reducing action of the coke. The slag and the steel are then withdrawn from the furnace in a conventional manner. At the same time, all of the zinc present in the pellets will be volatilized under the temperature conditions obtaining in the electric arc furnace and the zinc vapor may be withdrawn overhead as a vapor. This vapor is then condensed and a relatively pure grade of zinc metal will result.

The waste material which forms one of the raw materials for the process of this invention should comprise at least 0.5% by weight of zinc and in general the zinc content of the waste material will not exceed about 50% by weight, the remainder of the waste material being primarily ferric oxide thereof. The waste material is mixed together as has been pointed out above with varying proportions of coal and limestone. In general the coal will comprise about 25% to 35% by weight of the final mixture and the limestone content will be in the range of about 0% to 10% by weight.

One of the more important features of the invention relates to the amount of water which is introduced into the pelletizing apparatus. If too much water is employed the resulting pellets will tend to be soft and mushy and on the other hand if not enough water is present the pellets are formed only with difficulty. It has been observed that the optimum proportion of water lies in the range of 13% to 17% by weight of the total mixture.

Another feature of the invention which is important is the temperature to which the pellets are subjected in the sintering machine and this temperature generally should be in the range of 1800° F. to 2300° F. The pellets are subjected to this temperature for a period of time which is generally on the order of 5 to 15 minutes. Initiating heat for the sintering machine may be provided by external means such as gas burners but a part of the heat will also be produced by the pellets because of the partial combustion of the coal content. One method of operating the sintering machine is to provide the initial heat from external source such as a gas burner and thereafter drawing air through the traveling grates once combustion of the coal has been initiated.

In some instances where the pellets are not to be immediately transferred to the electric arc furnace it will be necessary to provide indirect cooling means in order to permit their storage. However, if the process is to be operated continuously the pellets may be transferred immediately to the electric arc furnace without intermediate cooling. The electric arc furnace is operated according to conventional techniques and carbon electrodes are ordinarily employed to provide the necessary arcs.

The following example will illustrate a preferred embodiment of this invention: 1504 pounds of coal having a size range of −65 mesh to 0 mesh, 476 pounds of limestone having a size range of 65 mesh to 0 mesh and 3258 pounds of a finely divided waste material from an electrostatic precipitator comprising 59.5% by weight iron and 2% by weight zinc oxide are intimately mixed and transferred to a pelletizing machine wherein the mixture is transformed into pellets having an average size of about ½ inch and a water content of about 15% by weight. The resulting pellets are then conveyed to a traveling grate sintering machine where they are subjected to a maximum temperature of about 2000 F. for a period of 10 minutes. The sintered pellets are then transferred to an electric arc furnace where they are subjected to a temperature of 2800° F. for a period of 10 minutes. Ultimately 52 pounds of zinc are recovered from the electric arc furnace together with 2000 pounds of pig iron having the following analysis:

| | |
|---|---|
| C | 3.5 |
| Si | 2.0 |
| Mn | 1.6 |
| P | 0.05 |
| S | 0.04 |

A slag also was obtained from the electric arc furnace which was separated and used for purposes having no connection with the present invention.

It will be apparent from the foregoing description and example that the process of this invention provides an excellent means for recovering metal values from waste materials and it will be apparent to those skilled in the art that the process described herein may be subjected to many modifications without departing from the spirit or scope of the invention. However, this application for Letters Patent is intended to cover all such modifications as would reasonably fall within the scope of the appended claims.

A carbon lined electric furnace may be used to prevent the deterioration of normal refractories as caused by zinc fumes. For this reason the electric furnace smelter is a preferred reactor. A smelter such as the conventional blast furnace would have extreme difficulty in coping with a zinciferous charge because of (1) refractory degradation from zinc fumes and (2) condensation of refluxed zinc fumes within the porous stack column that would eventually obstruct the charge voids and impede the draft flow for smelting reactions.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for the recovery of iron and zinc values from waste material containing ferric oxide and zinc recovered in steel-making operations comprising the steps of mixing said waste material with coal and limestone, forming the resulting mixture into green pellets, carbonizing said green pellets so as to char-bond the pellet while simultaneously calcining the limestone and partially reducing said ferric oxide, feeding said char-bonded pellets to an electric arc furnace and subjecting them to iron-making conditions therein, recovering zinc as an overhead vapor from said furnace, and recovering iron as a liquid from said furnace.

2. A process for the recovery of iron and zinc values from waste material containing ferric oxide and zinc recovered in steel-making operations comprising the steps of mixing said waste material with coal and limestone, adjusting the water content of the resulting mixture within the range of 12% to 16% by weight, forming said wet mixture into green pellets, carbonizing said green pellets so as to char-bond the pellet while simultaneously calcining the limestone and partially reducing said ferric oxide feeding said char-bonded pellets to an electric arc furnace and subjecting them to iron-making conditions therein, recovering zinc as an overhead vapor from said furnace, and recovering iron as a liquid from said furnace.

3. A process for the recovery of iron and zinc values from waste material containing ferric oxide and zinc recovered in steel-making operations comprising the steps of mixing said waste material with coal and limestone, adjusting the water content of the resulting mixture within the range of 12% to 16% by weight, forming said wet mixture into green pellets, carbonizing said green pellets so as to bond the pellet while simultaneously calcining the limestone and partialy reducing said ferric oxide, feeding said bonded pellets to an electric arc furnace and subjecting them to iron-making conditions therein, removing zinc as an overhead vapor from said furnace, and thereafter condensing same and recovering iron as a liquid from said furnace.

References Cited by the Examiner

UNITED STATES PATENTS

| | | | |
|---|---|---|---|
| 1,879,373 | 9/1932 | McComb | 75—5 |
| 3,099,553 | 7/1963 | Aamot | 75—89 X |
| 3,123,465 | 3/1964 | Sunday et al. | 75—24 |

FOREIGN PATENTS

| | | |
|---|---|---|
| 548,498 | 11/1957 | Canada. |

DAVID L. RECK, *Primary Examiner.*

H. F. SAITO, *Assistant Examiner.*